United States Patent [19]

Shirai et al.

[11] Patent Number: 5,793,197
[45] Date of Patent: Aug. 11, 1998

[54] APPARATUS FOR CONFIRMING STOP OF MOVABLE PORTION

[75] Inventors: Toshihito Shirai, Urawa; Hiroji Anzai, Utsunomiya; Koichi Futsuhara, Urawa, all of Japan

[73] Assignee: The Nippon Signal Co., Ltd., Tokyo, Japan

[21] Appl. No.: 718,475
[22] PCT Filed: Feb. 7, 1995
[86] PCT No.: PCT/JP95/00165
  § 371 Date: Oct. 7, 1996
  § 102(e) Date: Oct. 7, 1996
[87] PCT Pub. No.: WO96/24852
  PCT Pub. Date: Aug. 15, 1996
[51] Int. Cl.$^6$ .................................................. G01P 13/00
[52] U.S. Cl. .................................... 324/160; 340/648
[58] Field of Search .................................... 324/160, 161, 324/166, 173, 207.11, 207.12, 207.13, 207.16, 207.22, 207.24, 207.25; 340/635, 648, 679, 686; 318/282, 369, 466, 626, 652, 653

[56] References Cited

FOREIGN PATENT DOCUMENTS 53-91764   8/1978   Japan .

*Primary Examiner*—Walter E. Snow
*Attorney, Agent, or Firm*—Oblon, Spivak, McClelland, Maier & Neustadt, P.C.

[57] ABSTRACT

A detection means 1 detects changes in impedance generated at a coil TC caused in response to indentations Py1 and Py2 and projections provided at the surface of a movable portion Rot to generate a detection signal thereof. A speed judgement circuit 2, to which the detection signal from the detection means is provided, continuously generates a high level output signal A2$i$ when the detection signal e change interval becomes greater than a specific length of time. A level detection circuit 3, to which the detection signal e is provided, generates a high level output signal A1$i$ when the detection signal e is at or above a specific level. An AND circuit 4, to which the output signal A2$i$ from the speed judgement circuit 2 and the output signal A2$i$ from the level detection circuit 3 are provided, generates an output signal Z resulting from AND calculation of the two output signals A1$i$ and A2$i$. The delay in notification of movable portion stop is reduced and notification of movable portion stop is issued based upon verification that the coil TC is combined with the movable portion Rot in a normal manner and also verification that the movable portion Rot has been monitored until immediately before the stop of the movable portion Rot.

17 Claims, 11 Drawing Sheets 5,793,197

1

APPARATUS FOR CONFIRMING STOP OF MOVABLE PORTION

TECHNICAL FIELD

The present invention relates to an apparatus that confirms that a movable portion has stopped and, to be more specific, it relates to an apparatus that detects that the speed of a movable portion is at or below a specific value and outputs its detection signal as a movable portion stopped signal.

BACKGROUND ART

In an apparatus that includes a movable portion driven by a motor or the like, i.e., a robot or the like, a safety device that allows the operator to approach the apparatus only after it has been detected that the movable portion has completely stopped operation is required in order to assure safety of the operator who must approach the apparatus. Such safety devices include the motor rotation stop detecting device disclosed in International Publication WO94/23303, which is capable of reliably detecting that the rotation of the motor has stopped, including rotation under inertia, and operates toward safety when the apparatus has had a failure, thereby providing a high degree of safety. However, the device disclosed in this prior art publication has two problems yet to be solved: i.e., one; a delay that is generated in issuing notification of the stop because the device is not provided with a function for detecting the rotation rate and two; since a bridge circuit is employed for the rotation sensor, adjustment of the bridge circuit is required.

DISCLOSURE OF THE INVENTION

It is an object of the present invention to provide an apparatus for confirming stop of movable portion with which the delay in issuing notification of the stop of the movable portion is reduced.

It is a further object of the present invention to provide an apparatus for confirming stop of movable portion that is capable of issuing notification of movable portion stop after detecting that a coil is combined with the movable portion correctly, so that a danger state, in which the coil may come in contact with the movable portion, cannot occur.

It is a further object of the present invention to provide an apparatus for confirming stop of movable portion in which notification of movable portion stop is issued based upon verification that the movable portion has been monitored until immediately before the issuance of such notification.

It is a still further object of the present invention to provide an apparatus for confirming stop of movable portion that is capable of generating a signal at the time of startup to indicate stop of the movable portion based upon verification made via a startup switch.

It is a still further object of the present invention to provide an apparatus for confirming stop of movable portion that issues notification of movable portion stop based upon verification that the movable portion has been monitored, even at the time of startup.

It is a still further object of the present invention to provide an apparatus for confirming stop of movable portion that is capable of reducing the delay time that elapses before the movable portion stopped signal ceases when the movable portion has started to rotate or move.

It is a still further object of the present invention to provide an apparatus for confirming stop of movable portion that facilitates adjustment.

In order to achieve the objects described above, the apparatus for confirming stop of movable portion according to the present invention comprises a detection means, a speed judgement circuit, a level detection circuit and an AND circuit.

The detection means includes a coil that is provided in close proximity to a surface of the movable portion to detect changes in impedance at the coil caused by indentations and projections provided at the surface of the movable portion and to generate a detection signal therefrom. The detection signal output from the detection means is provided to the speed judgement circuit and when the detection signal change interval becomes greater than specific length of time, the speed judgement circuit generates a sustained high level output signal. The detection signal output from the detection means is also provided to a level detection circuit and when the detection signal is at or above a specific level, the level detection circuit generates a high level output signal. The output signals from the speed judgement circuit and the level detection circuit are provided to the AND circuit and the AND circuit generates an output signal that is resulting from the AND calculation of the two output signals.

As described above, in the apparatus for confirming stop of movable portion according to the present invention, the detection means includes a coil provided in close proximity to a surface of the movable portion to detect changes in impedance at the coil caused by indentations and projections provided at the surface of the movable portion. When the movable portion is constituted of a rotating body, the time intervals over which the coil encounters the indentations and projections provided at the surface of the movable portion change in correspondence to the rotation rate so that the slower the rotation rate, the longer the time intervals. Similarly, if the movable portion travels in a linear direction, the time intervals change in correspondence to the moving speed of the movable portion so that the slower is the moving speed, the longer the time intervals. Since the impedance at the coil changes in correspondence to changes in the time intervals which, in turn, concur with changes in the rotation rate or the moving speed of the movable portion, the time intervals over which the detection signal changes become longer as the rotation rate or the moving speed of the movable portion become lower. The operating modes of the movable portion may include both rotary and linear movement. Hereafter, for the purpose of simplifying the explanation, it is assumed that the movable portion performs rotation that includes linear motion.

The speed judgement circuit, to which the detection signal output from the detection means is provided, generates a high level output signal continuously when the detection signal change interval becomes equal to or greater than a specific length of time. As explained earlier, since the time intervals with which the detection signal changes become longer as the rotation rate of the movable portion becomes lower, it is assumed that the movable portion has stopped when the detection signal change interval becomes greater than the specific length of time and a high level output signal, which indicates stop of the movable portion, is generated. With this, the delay in notifying that the movable portion has stopped can be reduced. The high level output signal indicating that the movable portion has stopped is output continuously to prevent chattering of the notification of movable portion stop.

The level detection circuit to which the detection signal output from the detection means is provided, generates a high level output signal when the detection signal is at or above a specific level. The level detection circuit monitors the distance between the coil included in the detection means and the movable portion, and outputs a low level output signal as a danger signal when the distance becomes reduced and a danger state arises, in which the movable portion and the coil may come in contact with each other.

Since the AND circuit, to which the output signals from both the speed judgement circuit and the level detection circuit are provided, generates an output signal comprising the AND calculation of the two output signals, notification of movable portion stop can be issued after detecting that the coil and the movable portion are combined correctly without a danger state arising in which the coil may come in contact with the movable portion.

In addition, the apparatus for confirming stop of movable portion according to the present invention may include a self holding circuit. The self holding circuit uses changes in the output signal from the detection means as a trigger input signal and uses the output signal from the speed judgement circuit as a reset input signal. The AND circuit, to which the output signals from the self holding circuit and the level detection circuit are provided, generates an output signal comprising the AND calculation of the two output signals. When the movable portion is rotating, the output signal from the detection means changes in conformance to the changes caused by the indentations and projections provided at the surface of the movable portion as explained earlier. Since the self holding circuit uses changes in the output signal from the detection means as a trigger input signal, it, in effect, constantly monitors the rotation of the movable portion. The self holding circuit, to which a reset input signal constituted of an output signal from the speed judgement circuit is provided upon receiving the provided trigger input signal mentioned above, generates a high level holding output when the reset input signal is set to high. Consequently, with the present invention, the notification of movable portion stop is issued based upon verification that the movable portion has been monitored until immediately before the notification.

The AND circuit, to which the output signals from the self holding circuit and the level detection circuit are provided, generates an output signal resulting from the AND calculation of the two output signals. As a result, notification of movable portion stop can be issued based upon verification that the coil and the movable portion are combined correctly so that a danger state, in which they may come in contact with each other, does not arise and also based upon verification that the movable portion has been monitored until immediately before the issuance of the notification of movable portion stop.

When the self holding circuit described above is provided, a means for startup switching that is operated from the outside may also be provided. The means for startup switching is, in turn, provided with a contact point for providing the self holding circuit with the trigger input signal. Without such a means for startup switching provided, if the movable portion is not rotating at the time of startup, a trigger input signal cannot be sent to the self holding circuit and, consequently, even when the reset input signal provided by the speed judgement circuit is set to high, the output signal from the self holding circuit is not set to high. The means for startup switching is provided to eliminate this problem arising at the time of startup. This means for startup switching has a contact point for providing the self holding circuit with a trigger input signal so that a signal indicating movable portion stop can be generated based upon verification made by the means for startup switching.

Preferably, the means for startup switching should be provided with another contact point which is closed when the trigger input signal is turned off. In this case, the present invention should further include another AND circuit. This other AND circuit generates an AND output using the signal provided through the other contact point mentioned above of the means for startup switching when the trigger input signal for the self holding circuit is turned off and the output signal from the self holding circuit as its input signals. If the means for startup switching is provided only with the contact point for providing a trigger input signal and an error occurs whereby a sustained trigger signal is provided to the self holding circuit through this contact point, such an error will result in a further error, in which the self holding circuit outputs a sustained high level signal. In contrast, by providing another contact point which is closed when the trigger input signal is turned off in the means for startup switching and also providing the other AND circuit described above, the error mentioned above can be avoided, and even at the time of startup, the notification of movable portion stop can be issued based upon verification of movable portion monitoring.

Furthermore, in the apparatus for confirming stop of movable portion according to the present invention, the speed judgement circuit may include two on-delay circuits and an off-delay circuit. The two on-delay circuits, to which the signal output from the detection means, which includes the detection signal, is commonly provided, generate output signals whose phases are the inverse of each other. The off-delay circuit is provided with an OR signal comprised of the output signals from the two on-delay circuits. In this structure, the signal indicating movable portion stop can be turned off promptly when the movable portion has started rotating or traveling.

Moreover, in the apparatus for confirming stop of movable portion according to the present invention, the coil may constitute a resonance circuit which includes the movable portion. Since the movable portion is provided with indentations and projections on its surface, the resonance frequency of the resonance circuit constituted with the coil and the movable portion changes depending upon whether the coil is detecting an indentation or a projection. When the resonance frequency to be detected is specifically set at the frequency when the coil is detecting an indentation, the level of the detection signal obtained by the resonance characteristics of a projection is lower than the level of the detection signal obtained in conformance to the resonance characteristics of an indentation. In addition, when the coil has dropped, the resonance characteristics will be different from the resonance characteristics obtained from either the indentations or the projections. Thus, based upon the differences in the resonance characteristics, errors such as the coil dropping and the like, as well as the rotation or travel of the movable portion can be detected without employing a bridge circuit. As a result, an apparatus for confirming stop of movable portion that facilitates adjustment can be achieved.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

BEST MODE FOR CARRYING OUT THE INVENTION

Figure 1:
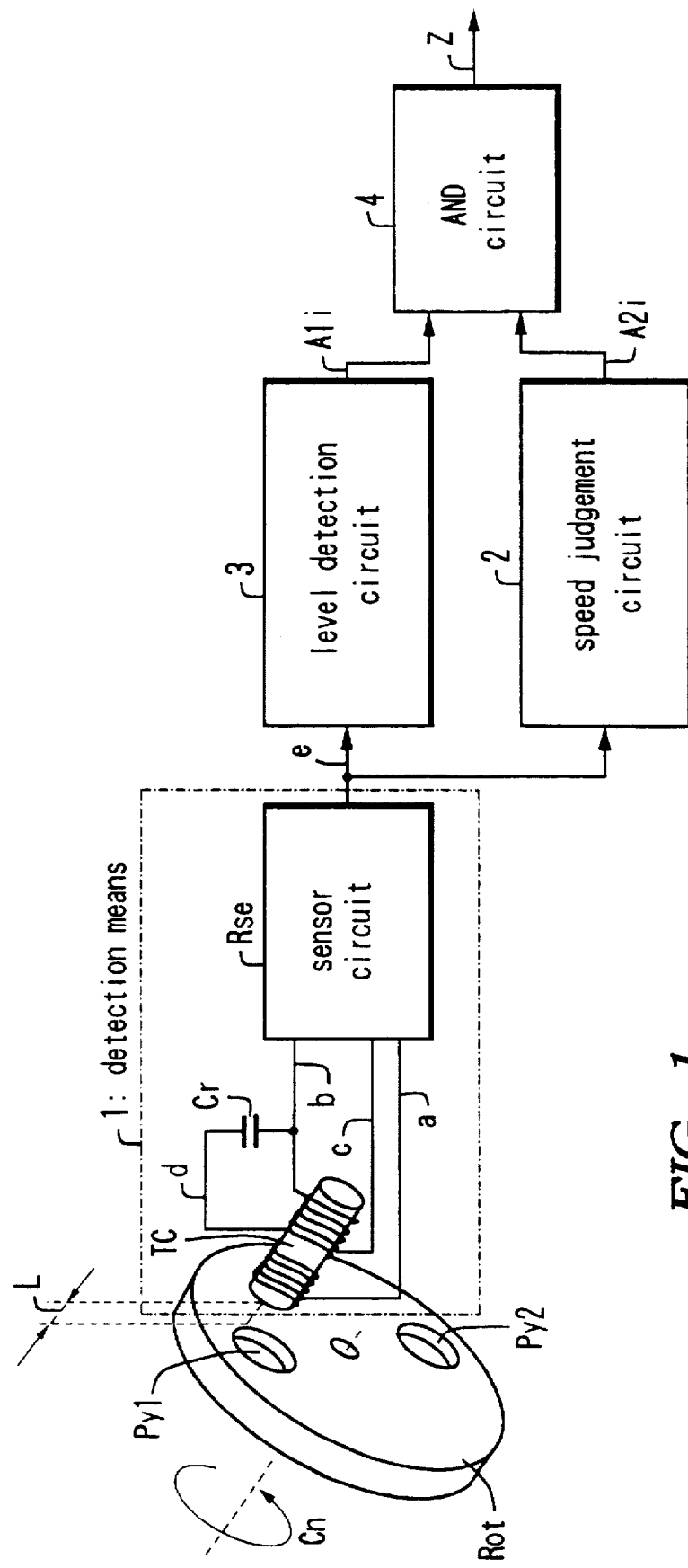
FIG. 1 is a block diagram of the apparatus for confirming stop of movable portion according to the present invention.

The apparatus for confirming stop of movable portion according to the present invention shown in FIG. 1 includes a detection means 1, a speed judgement circuit 2, a level detection circuit 3 and an AND circuit 4. Rot indicates a metal movable portion that rotates in the direction indicated with the arrow Cn with an output from a motor or the like, and Py1 and Py2 indicate indentations or holes provided in the movable portion Rot. In the movable portion Rot in the figure, the areas of the surface where the indentations or holes Py1 and Py2 are not provided constitute projections.

The detection means 1 includes a coil TC, which is provided in close proximity to a surface of the movable portion Rot over a distance L. The detection means 1 detects changes in impedance generated at the coil TC caused in response to the indentations or holes Py1 and Py2 (hereafter referred to as the indentations Py1 and Py2) provided at the surface of the movable portion Rot, and outputs a detection signal thereof. The detection means 1 includes a sensor circuit Rse, which detects the changes in impedance at the coil TC, which is separated from the movable portion Rot by the distance L, that are generated in correspondence to the presence or absence of the indentations Py1 and Py2.

The speed judgement circuit 2, to which the detection signal e output from the detection means 1 is provided, outputs a high level output signal A2i (logical value 1), when the signal e indicates a specific speed or lower. The signal that indicates rotation is generated according to changes in the output signal e of the sensor circuit Rse resulting from changes in impedance at the coil TC caused by the indentations Py1 and Py2 at the surface of the metal movable portion Rot.

The level detection circuit 3, to which the detection signal e is also output from the detection means 1, generates an output signal A1i at high level (logical value 1) when the detection signal e is at or higher than a specific level. The level detection circuit 3 is provided to monitor the distance L between the coil TC and the movable portion Rot.

The AND circuit 4, to which the output signals A1i and A2i are provided from the level detection circuit 3 and the speed judgement circuit 2 respectively, generates an output signal Z resulting from the AND calculation of the two output signals A1i and A2i. While the coil TC maintains a normal distance L relative to the surface of the movable portion Rot, if the output signal A1i of the level detection circuit 3 is at high level (logical value 1) and the output signal A2i of the speed judgement circuit 2 has logical value 1, the output signal Z of the AND circuit 4 is at high level (logical value 1) to indicate that the movable portion is stopped. If the logical value of either of the input signals is 0, the output signal Z is set to low level (logical value 0).

As explained above, in the apparatus for confirming stop of movable portion according to the present invention, the detection means 1 includes the coil TC provided in close proximity to the surface of the movable portion Rot so that the detection means 1 can detect changes in impedance generated at the coil TC caused in response to indentations Py1 and Py2 provided at the surface of the movable portion Rot. The time intervals with which the coil TC responds to the indentations Py1 and Py2 provided at the surface of the movable portion Rot change in correspondence to the rotation rate if the movable portion Rot is a rotating body, and the lower the rotation rate, the longer the time intervals. In addition, when the movable portion Rot moves linearly, the time intervals change in correspondence to the moving speed, and the lower the moving speed, the longer the time intervals. Since the changes of impedance at the coil TC correspond to time intervals that change as the rotation rate or moving speed of the movable portion Rot changes, the change time interval in the detection signal e becomes longer as the rotation rate or moving speed of the movable portion Rot becomes lower.

The speed judgement circuit 2, to which the detection signal e output from the detection means 1 is provided, continuously generates the output signal A2i at high level (logical value 1) when the change time interval of the detection signal e is at a specific length of time or longer. Since the change time interval of the detection signal e becomes longer as the rotation rate or moving speed of the movable portion Rot becomes lower, the movable portion is assumed to have stopped when the detection signal e change time interval becomes equal to or longer than a specific length of time, and the output signal A2i at high level (logical value 1) is generated, which indicates that the movable portion has stopped. With this, the delay in issuing notification of stop of the movable portion Rot is reduced. The output signal A2i at high level (logical value 1) indicating movable portion stop is output continuously. Thus, chattering of the movable portion stop notification is prevented.

The level detection circuit 3, to which the detection signal e output from the detection means 1 is provided, generates the output signal A1i at high level (logical value 1) when the detection signal e is at or over a specific level. Thus, when a state arises in which the distance L is reduced and the coil TC might come in contact with the movable portion Rot, an output signal A1i at low level (logical value 0) is output as a danger signal.

The AND circuit 4, to which the output signals A1i and A2i are provided from the level detection circuit 3 and the speed judgement circuit 2 respectively, generates the output signal Z resulting from the AND calculation of the two output with signals A1i and A2i. Consequently, it is possible to issue notification of movable portion stop upon detecting that there is no danger state arising in which the coil TC may come in contact with the movable portion Rot.

International Publication WO 94/2303 discloses features such as: a signal for indicating rotation included in the output signal of the sensor circuit; the level detection circuit monitors to ensure that the output signal is within a specific level range; a rotation stop detection circuit that generates a high level output signal (logical value 1) when the rotation signal included in the output signal goes off (indicating stop of rotation) and the AND calculation output signal of the output signal from the level detection circuit and the output signal from the rotation stop detection circuit is used as an output signal indicating rotation stop. However, this prior art technology does not include a movable portion speed judgement circuit. Thus, in order to achieve the movable portion speed judgment, a special contrivance is required. A specific example of this is explained below.

Figure 2:
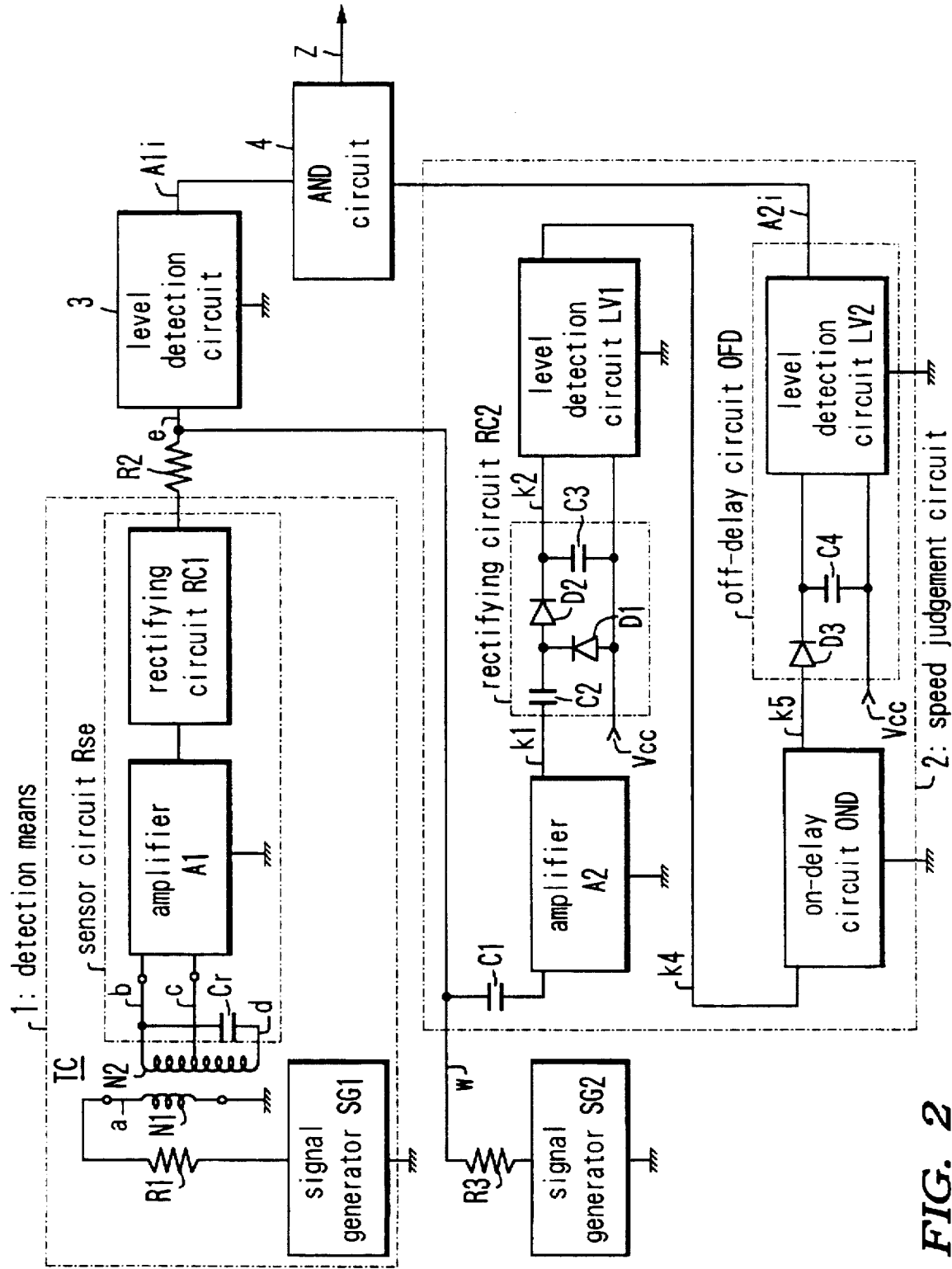
FIG. 2 shows a specific example of the apparatus for confirming stop of movable portion according to the present invention shown in FIG. 1.

FIG. 2 shows a specific example of circuit configuration of the apparatus for confirming stop of movable portion shown in FIG. 1. In FIG. 2, the detection means 1 includes the coil TC and the sensor circuit Rse. An AC signal output from a signal generator SG1 is provided to a first winding N1 of the coil TC via a current limiting resistance R1. The AC signal induced to a second winding N2 is amplified at an amplifier A1 and the output signal from the amplifier A1 is rectified and smoothed by a rectifying circuit RC1 so that it becomes a DC output signal e. The coil TC is provided with a resonance capacitor Cr which resonates at the operating frequency of the AC signal provided by the signal generator SG1.

The changes in impedance of the coil TC caused in response to the indentations Py1 and Py2 at the surface of the movable portion Rot (see FIG. 1) manifests as changes in the output signal e from the rectifying circuit RC1. Note that the structure of the coil TC is not necessarily limited to the structure shown in the figure. For instance, it may be provided with only one winding. Apart from that, a variety of coil structures to constitute an electromagnetic induction sensor may be adopted.

Figure 3:
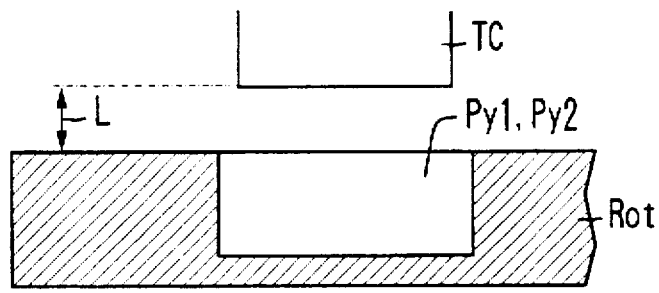
FIG. 3 shows the relationship between the coil and the movable portion in the apparatus for confirming stop of movable portion according to the present invention shown in FIGS. 1 and 2.
Figure 4:
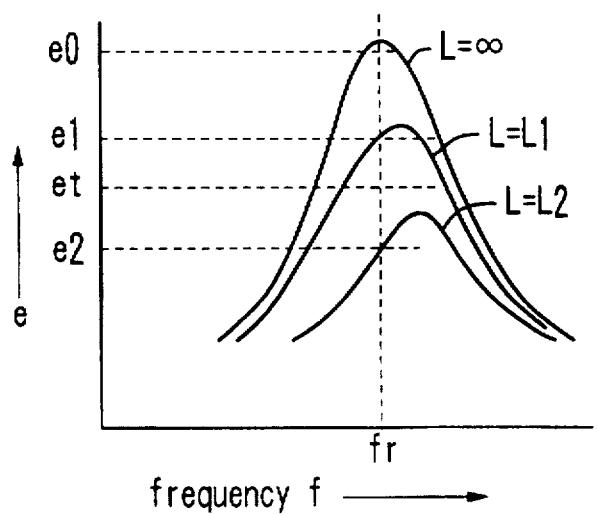
FIG. 4 shows the frequency-detection signal characteristics with various combinations of the coil and the movable portion shown in FIG. 3.

FIG. 3 is an enlarged view of a structure in which the movable portion Rot constituted with, for instance, an iron plate, is provided at the front of the coil TC. FIG. 4 shows changes in the rectified output signal e when the coil TC and the movable portion Rot are positioned as shown in FIG. 3. When the movable portion Rot is not present, the rectified output signal e is equivalent to a curve with L=∞. This approximately corresponds to a case in which the indentations Py1 and Py2 in FIGS. 1 and 2 constitute large holes with bottoms and the coil TC faces opposite the indentations Py1 and Py2. When the excitation frequency f of the coil TC is at the resonance frequency fr, the output voltage e=e0 with L=∞. When the coil TC faces opposite a surface constituting a projection of the movable portion Rot, the output signal e is reduced to e=e1 with the distance L=L1, and is reduced to e=e2 (e1>e2) with L=L2 (L2<L1). Consequently, when the distance L between the movable portion Rot and the coil TC is set at the distance L1, the output signal e changes between the output voltage e0 and the output voltage e1 as the movable portion rotates.

In FIG. 4, the level of the voltage et constitutes the threshold value of the level detection circuit 3 (FIG. 2) and when the rectified output signal e is at or lower than the threshold value et, the output signal A1i of the level detection circuit 3 becomes a low level output signal with a logical value of 0 whereas, when the rectified output signal e is at a level higher than the threshold value et, the output signal A1i of the level detection circuit 3 is a high level output signal with a logical value of 1. Thus, if the coil TC approaches the surface of the movable portion Rot so that the distance L=L2, the output signal of the level detection circuit 3 will have a logical value of 0. Consequently, if a state in which the distance L is reduced and the coil TC may come into contact with the movable portion Rot, the output signal A1i at low level (logical value 0) is output as a danger signal to avoid the danger of the coil TC coming into contact with the movable portion Rot.

Next, the structure and operation of the speed judgement circuit 2 are explained. The speed judgement circuit 2 which is enclosed with the chain lines in FIG. 2, includes an amplifier A2 which amplifies the change in the output signal e output of the rectifying circuit RC1 of the detection means 1, a rectifying circuit RC2 for generating the envelope detection output of the output signal from the amplifier A2, a level detection circuit LV1, an on-delay circuit OND for determining the rotation rate and an off-delay circuit OFD for generating an output signal at a high output level with a logical value of 1 after the movable portion Rot enters a low speed rotation state prior to stopping until the movable portion Rot enters a high speed rotation state again. The output signal from the off-delay circuit OFD becomes an input signal of the AND circuit 4 as the output signal A2i of the speed judgement circuit 2 along with the output signal A1i of the level detection circuit 3.

When constituting the level detection circuit 3, the LV1 and the AND circuit 4 as fail-safe elements, one of the fail-safe window comparator/AND gates disclosed in U.S. Pat. No. 5, 345,138, U.S. Pat. No. 4,661,880 and U.S. Pat. No. 5,027,114 may be used. The same applies to the level detection circuits LV1, LV2 and the AND circuit 4, which are to be explained later.

The changes in the output signal e from the rectifying circuit RC1 are input to an amplifier A2 via a coupling capacitor C1. In this case, if a disconnection failure should occur in the capacitor C1, the rotation signal generated at the rectifying circuit RC1 (changes in the rectified output signal e) is not communicated to the amplifier A2 and, as a result, the speed judgement circuit 2 may indicate a rotation stop state even when the movable portion is rotating. In order to ensure that such a problem does not occur, a signal generator SG2 is provided in this embodiment. A high frequency output signal w from the signal generator SG2, set at low level (logical value 0), is superimposed on the output signal from the rectifying circuit RC1 via a resistance R3. The output frequency of the signal generator SG2 is high enough to ensure that the capacitance of the smoothing capacitor included in the rectifying circuit RC1 does not work as a load impedance. Because of this, the output signal w of the signal generator SG2 is input to the amplifier A2 at a signal level achieved by dividing the voltage between the resistance R3 and a resistance R2. The technology through which a rotation signal is monitored while taking into consideration a possible disconnection failure of the coupling capacitor C1 is disclosed in the International Publication WO 94/23303 described earlier.

In addition, if the change in the output signal of the rectifying circuit RC1, which occurs as the movable portion Rot rotates, contain a DC component, a clamp amplifying circuit constituted with a diode may be employed for an AC amplifying circuit which is constituted with the coupling capacitor C1 and the amplifier A1. A state in which the change in the output signal of the rectifying circuit RC1, which occurs as the movable portion Rot rotates, contains a DC component may occur when the time width over which the output signal is at high level (logical value 1) with e=e0, differs from the time width over which the output signal is at low level (logical value 0) with e=e1, for instance. The technology that employs a clamp amplifying circuit for an input signal with different lengths of sustaining time over which it remains at high level (logical value 1) and over which it remains at low level (logical value 0), is already known through the disclosures made in Japanese Examined Patent Publication Nos. 4320/1980 and 34396/1975.

Figure 5:
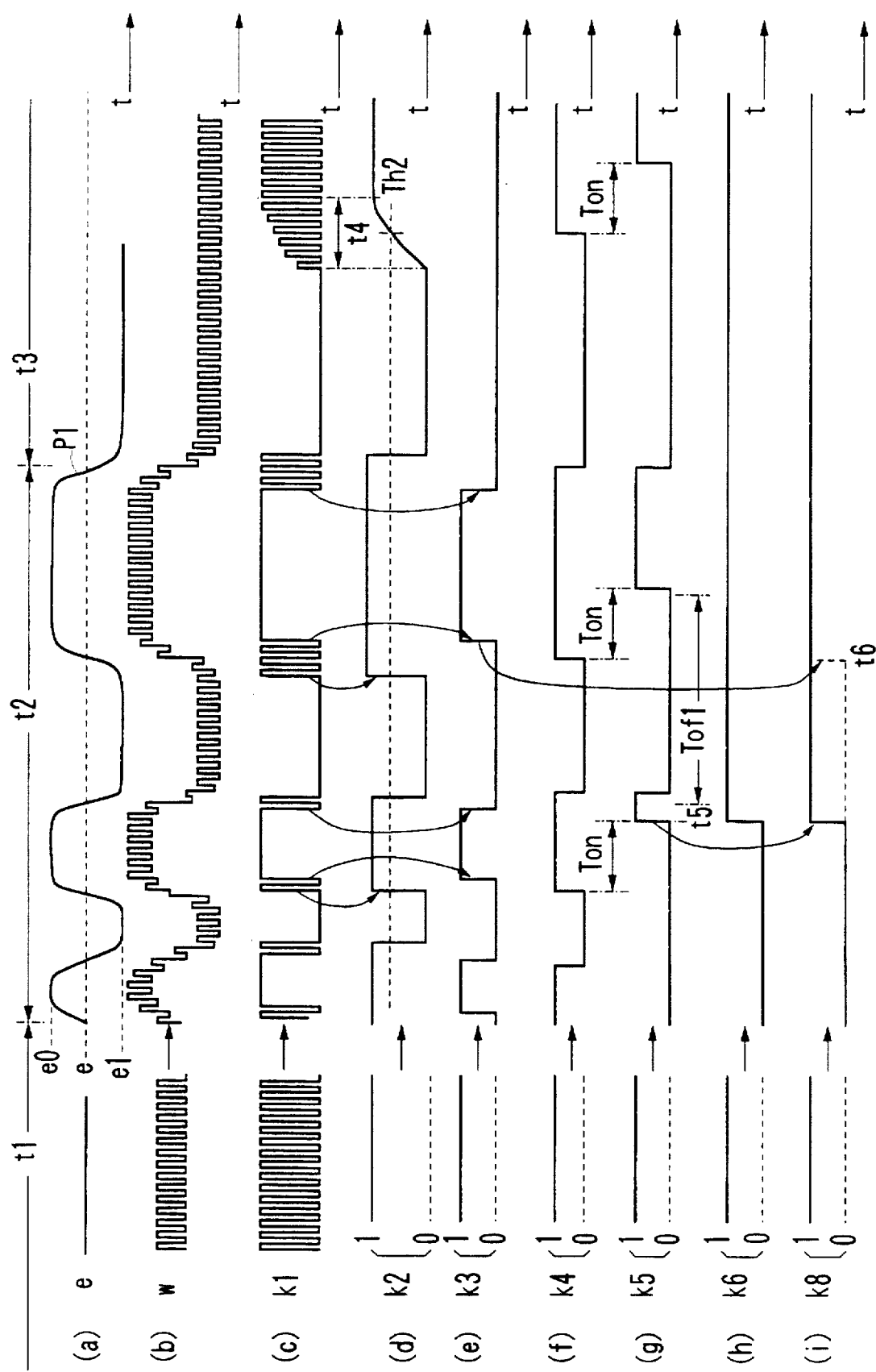
FIG. 5 shows a time chart illustrating the operation of the apparatus for confirming stop of movable portion shown in FIG. 2.

Next, the principle structure and the operation of the speed judgement circuit 2 shown in FIG. 2 are explained in reference to the time chart shown in FIG. 5.

In FIG. 5, a time block t1 on a time axis t constitutes a time period during which the movable portion Rot is in a stopped state prior to starting to rotate. Time block t2 constitutes a time period over which the movable portion Rot is in a transition state during which the movable portion Rot shifts from a rotating state to a stopped state and time block t3 is a time period over which the movable portion Rot is assumed to have reached the stopped state. Time Chart (a) shows the output signal e of the rectifying circuit RC1. During the time block t1, over which the movable portion Rot is in a stopped state, the output signal e indicates a specific value at a level which is between the maximum value e0 and the minimum value e1 of the changes in amplitude which occur as the movable portion Rot rotates. During the time block t2, the cycle of the changes in amplitude of the output signal e increases as the rotation of the movable portion Rot slows down. In the time block t3, during which the movable portion Rot has entered a stopped state, the stop is shown as occurring at a position between the indentations Py1 and Py2 in the movable portion Rot shown in FIG. 1, for instance.

Time Chart (b) shows a state in which the output signal w that is output from the signal generator SG2 is superimposed on the signal e.

Time Chart (c) shows an output signal resulting from the signal w being input to the amplifier A2 via the capacitor C1 to be amplified. In the vicinity of the apex of the change in the signal e, since the input level is high, the amplifier A2 becomes saturated and the components of the signal w disappear. The components of the amplified signal w are generated only in the vicinity of the zero point, which corresponds to the vicinity of the level that represents the average value of the signal e.

At the rectifying circuit RC2 on the output side of the amplifier A2, since the capacitance of the coupling capacitor C2 is sufficiently large, the change in the signal e, which results from the rotation, is manifested directly as a terminal voltage at a smoothing capacitor C3. The capacitance of the smoothing capacitor C3 is set to ensure that only the high frequency signal w is smoothed. Because of this, as shown in Time Chart (d), only the high frequency signal w of the terminal voltage of the smoothing capacitor C3 is rectified and smoothed, and the portion representing the change in the signal e in the output signal of the amplifying circuit A2 is directly output between the terminals of the capacitor C3.

The output signal of the level detection circuit LV1, too, follows a pattern similar to that shown in Time Chart (d). In other words, the rectifying circuit RC2 and the level detection circuit LV1 constitute a low pass filter through which a high level (logical value 1) output signal is generated relative to a high frequency input signal and an output signal responds to a low frequency input signal.

Since the movable portion Rot is in a stopped state during the time block t1, only the high frequency signal w is amplified at the amplifier A2, which is then output as an output signal k2 at high level (logical value 1) of the rectifying circuit RC2.

While the time block t3 represents a state in which the movable portion Rot has stopped after completion of the change P1 in the signal e, the movable portion Rot may, in fact, have moved slightly after passing over the indentations Py1 and Py2 before reaching the next indentation Py1 or Py2. The amplifier A2 amplifies this change and no component of the signal w is generated at the coupling capacitor C1 until the electric charge accumulated because of the change has been discharged. The rise of the signal during the time block t4 in Time chart (c) and (d) represent this fact. The level Th2 entered in Time Chart (d) indicates the threshold value of the level detection circuit LV1.

The on-delay circuit OND measures the length of time over which a high level state is sustained in the level detection circuit LV1. In a DC high level state, the state of maximum level output is indicated with logical value 1 while the low level state corresponds to logical value 0. The on-delay circuit OND generates a high level (logical value 1) output signal k5 (see Time Chart (g)) when a specific delay time Ton has elapsed after a high level (logical value 1) input signal k4 is input. This signal k5 with a logical value of 1 signifies that the movement of the movable portion Rot is at or has fallen under a specific speed. Then, if the input signal k4 (see Time Chart (f)) does not remain in a high level state (logical value 1) until the delay time Ton has elapsed and the logical value 0 is set within a short time t<Ton, the on-delay circuit OND measures again the period of time over which the high level state is sustained the next time a high level (logical value 1) input signal is generated, and generates a high level (logical value 1) output signal k5 after the specific length of time Ton has elapsed. Circuit s provided with such a function already exist in the known art, as disclosed in the International Publication WO 94/723303 mentioned earlier and in Japanese Examined Patent Publication No. 23006/71989.

Since the output signal k5 with the logical value of 1 that is output from then on-delay circuit OND i s generated only when the input signal k4 is at high level (logical value 1), as shown in Time Chart (g), the output signal with the logical value of 1 is generated only when the signal k4 is at high level (logical value 1) even after the movable portion Rot is rotating at a speed at or lower than a specific level and, therefore, it is intermittent. The off-delay circuit OFD is provided with a function for holding the output signal k5 of the on-delay circuit OND which is generated intermittently as explained above. As shown in FIG. 1, in a structure in which the rotation of the movable portion Rot is detected intermittently with the timing with which the coil TC comes face to face with the indentations Py1 and Py2, it is necessary to hold the signal indicating detection of the indication Py1 during the period of time after the signal generated by the detection of, for instance, the indentation Py1 by the coil TC is received until the signal indicating detection of the indentation Py2 is subsequently received. The off-delay circuit OFD is provided to assure such a holding function. In the embodiment shown in FIG. 2, the signal k5, which is output at a high level (logical value 1) from the on-delay circuit OND is integrated by a diode D3 and a capacitor C4 and its level is detected by the level detection circuit LV2. The discharge of the electrical charge which has accumulated in the capacitor C4 is performed through the input resistance of the level detection circuit LV2. With this, the intermittent output signal k5 of the on-delay circuit OND is converted to a sustained high level (logical value 1) output signal k6 (see Time Chart (h)).

In FIG. 2, the output signal of the rectifying circuit is shown in a circuit configuration in which it is clamped at the source potential Vcc. The reason for this is that the output signals of the amplifiers A1 and A2 and the signals processed at the level detection circuits and the on-delay circuit are AC signals and that input signals at a level higher than that of the source potential are required for the input signals for the level detection circuits and the on-delay circuit.

Next, in reference to FIGS. 6 to 12, another embodiment of the apparatus for confirming stop of movable portion according to the present invention is explained. In these figures, the same reference numbers as those in FIGS. 1 to 5 are assigned to identical components.

Figure 6:
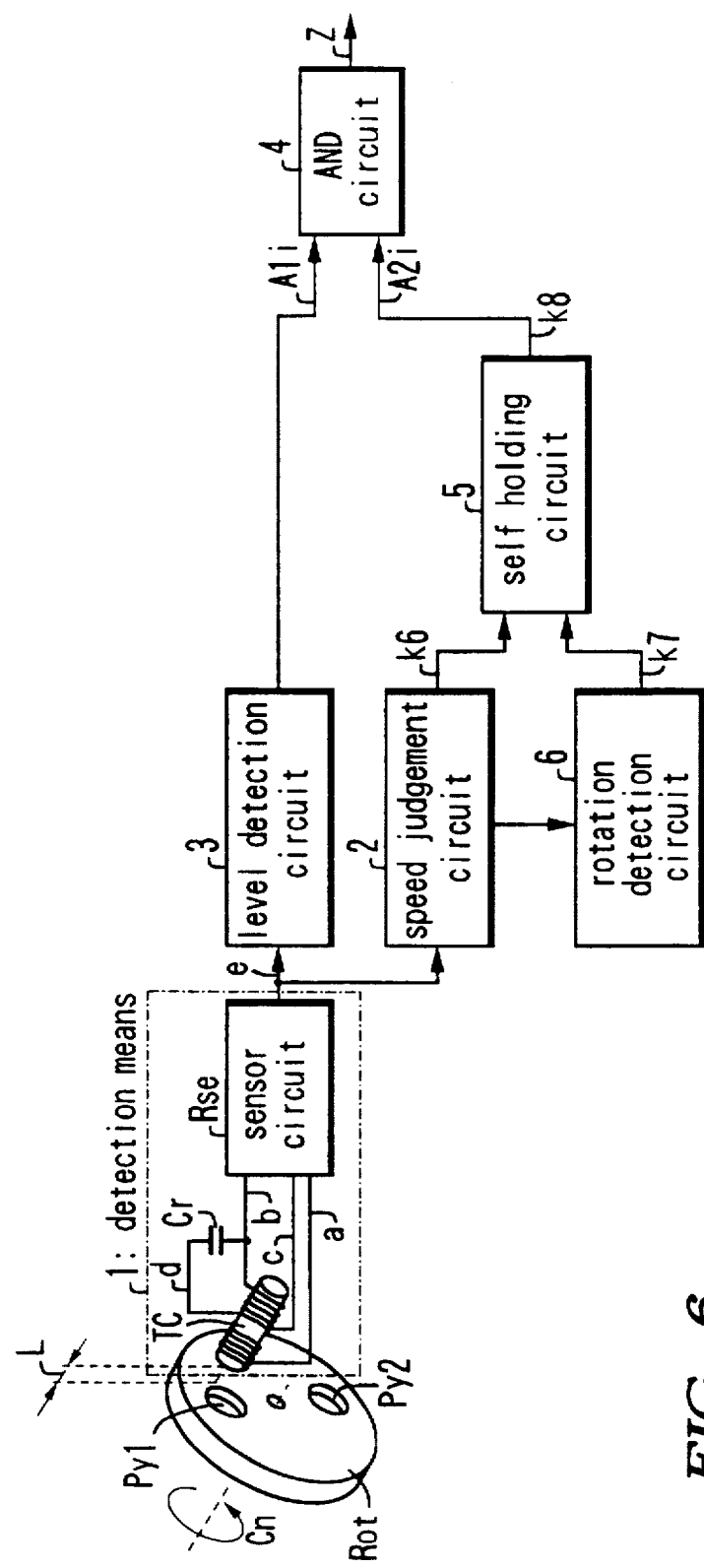
FIG. 6 is a block diagram of another embodiment of the apparatus for confirming stop of movable portion according to the present invention.

First, in FIG. 6, tthe apparatus for confirming stop of movable portion includes a self holding circuit 5. The self holding circuit 5 uses the change in the output signal of the detection means 1 as a trigger input signal and uses the output signal k6 of the speed judgement circuit 2 as a reset input signal. The AND circuit 4, to which the output signals A2$i$ and A1$i$ are provided from the self holding circuit 5 and the level detection circuit 3 respectively, generates an output signal Z resulting from the AND calculation of the two output signals A2$i$ and A1$i$. When the movable portion Rot is rotating or moving, the output signal e of the detection means 1 changes in conformance to the indentations and projections provided at the surface of the movable portion Rot, as explained earlier.

The operation of the embodiment shown in FIG. 6 may be explained in reference to the time chart shown in FIG. 5. Since the self holding circuit 5 uses change in the output signal e of the detection means 1 as a trigger input signal, the rotation or movement of the movable portion Rot is monitored at all times. The self holding circuit 5, upon receiving the trigger input signal described above, is further provided with a reset input signal k6 (see Time Chart (h) in FIG. 5) which is constituted from the output signal of the speed judgement circuit 2, and when the reset input signal is set to high (logical value 1), the self holding circuit 5 generates a high level (logical value 1) holding output k8 (see Time Chart (i) in FIG. 5). As a result, in this embodiment, the notification of movable portion stop is issued based upon verification that the movable portion Rot has been monitored until immediately before the notification is issued.

The AND circuit 4, to which the output signals A2$i$ and A1$i$ are provided from the self holding circuit 5 and the level detection circuit 3 respectively, generates the output signal Z resulting from the AND calculation of the two output signals A2$i$ and A1$i$. Consequently, notification that the movable portion has stopped can be issued based upon verification that the movable portion Rot has been monitored until immediately before the notification of movable portion stop is issued and based upon verification that the detection means 1 is combined with the movable portion Rot correctly without causing an error such as falling down.

In the embodiment shown in the figure, a means for rotation detection 6 is provided. The means for rotation detection 6 is a circuit for detecting rotation. With this means for rotation detection 6, a signal indicating rotation is extracted from the speed judgement circuit 2 and its output signal k7 is used as a trigger input signal for the self holding circuit 5 and the output signal k6 of the speed judgement circuit 2 is used as a reset signal while output signal k8 of the self holding circuit 5 is used as an input signal at the AND circuit 4.

Figure 7:
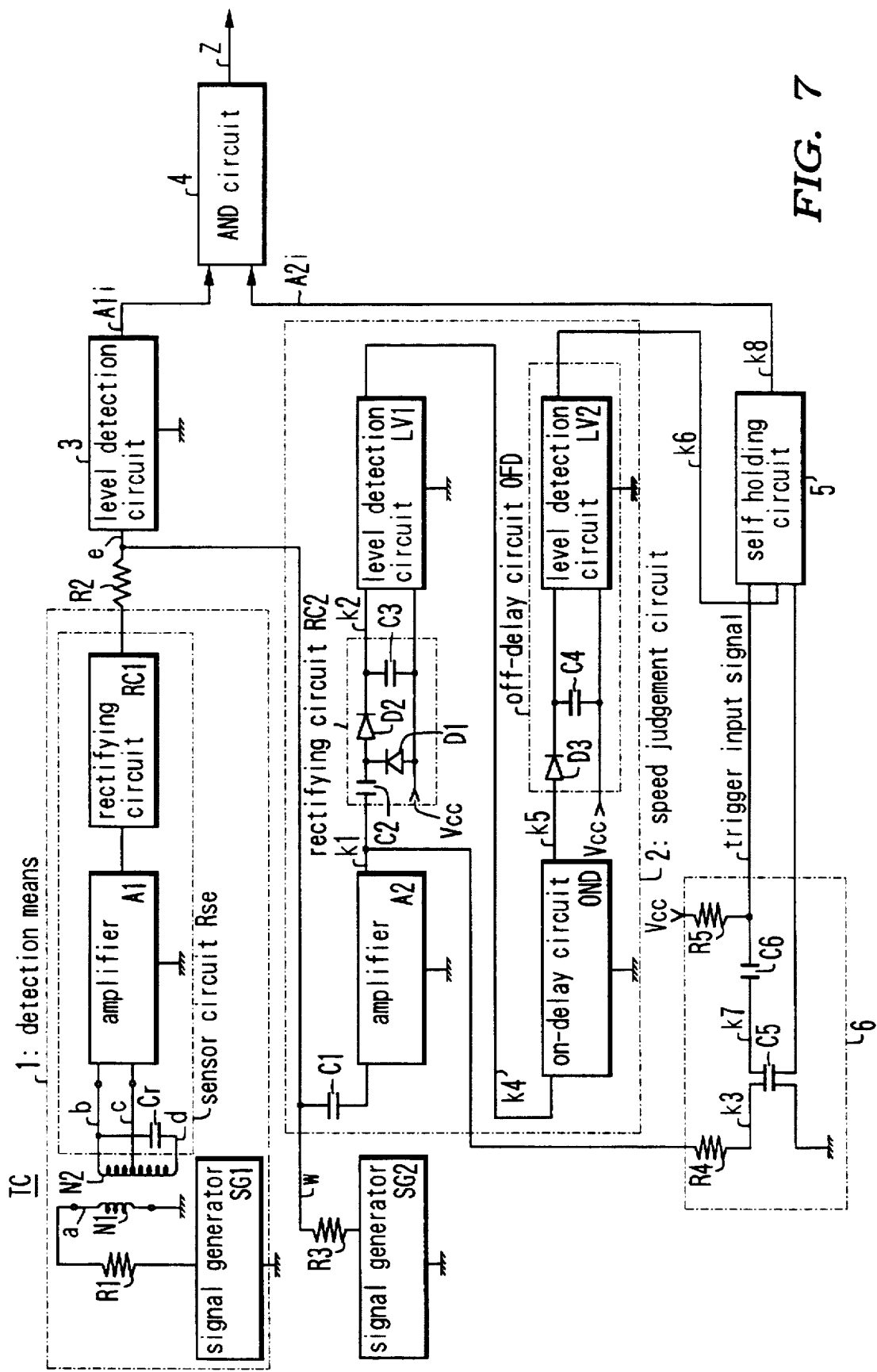
FIG. 7 shows a specific example of the apparatus for confirming stop of movable portion according to the present invention shown in FIG. 6.

FIG. 7 shows a more detailed circuit configuration of the apparatus for confirming stop of movable portion shown in FIG. 6. In the figure, reference numbers that are the same as those in FIG. 2 indicate identical components. In FIG. 7, an output signal k1 of the amplifier A2, which constitutes a component of the speed judgement circuit 2 is input to the means for rotation detection 6, and an output signal k7 of this means for rotation detection 6 becomes a trigger input signal for the self holding circuit 5. The means for rotation detection 6 includes a current limiting resistance R4, a 4-terminal capacitor C5, a coupling capacitor C6 and a discharge resistance R5. While the capacitor C6 and the resistance R5 constitute a differentiating circuit, if this time constant is large, the change in the voltage between the terminals of the capacitor C5 is directly used as a trigger input signal of the self holding circuit 5.

The signal k1, which is shown in Time Chart (c) in FIG. 5 is input to the capacitor C5 via the resistance R4. The resistance R4 is inserted so that the capacitor C5 does not affect the output side of the amplifier A2. As in the case of the capacitor C3, the capacitance of the capacitor C5 has a low impedance relative to the high frequency signal w and, consequently, a terminal voltage signal k3 of the capacitor C5 is a signal similar to that shown in Time Chart (d). The rise of the signal k3 becomes a trigger signal of the self holding circuit 5 via the capacitor C6.

The self holding circuit 5 uses the output signal k6 of the off-delay circuit OFD of the speed judgement circuit 2 as a reset signal. After the output signal k6 of the off-delay circuit OFD rises, its output signal k8 is generated at time point t5 concurrently with the rise of the output signal k6 when the capacitance of the coupling capacitor C6 is large, and is generated at the point in time (time point t6) at which the terminal voltage of the capacitor C5 has risen next time when the capacitance of the coupling capacitor C6 is small, since the trigger input signal becomes a differential signal in that case, as shown in Time Chart (i) in FIG. 5.

In such a structure, even if the coil TC drops during rotation of the movable portion Rot, no output signal that erroneously indicates stop of rotation will be generated. In other words, in the apparatus for confirming stop of movable portion shown in FIG. 7, the movable portion Rot is monitored until immediately before the stop signal k8 with a logical value of 1 is generated. The self holding circuit may be constituted by employing a circuit in the known art such as those disclosed in International Publication WO 94/23303 and International Publication WO 94/23496.

Figure 8:
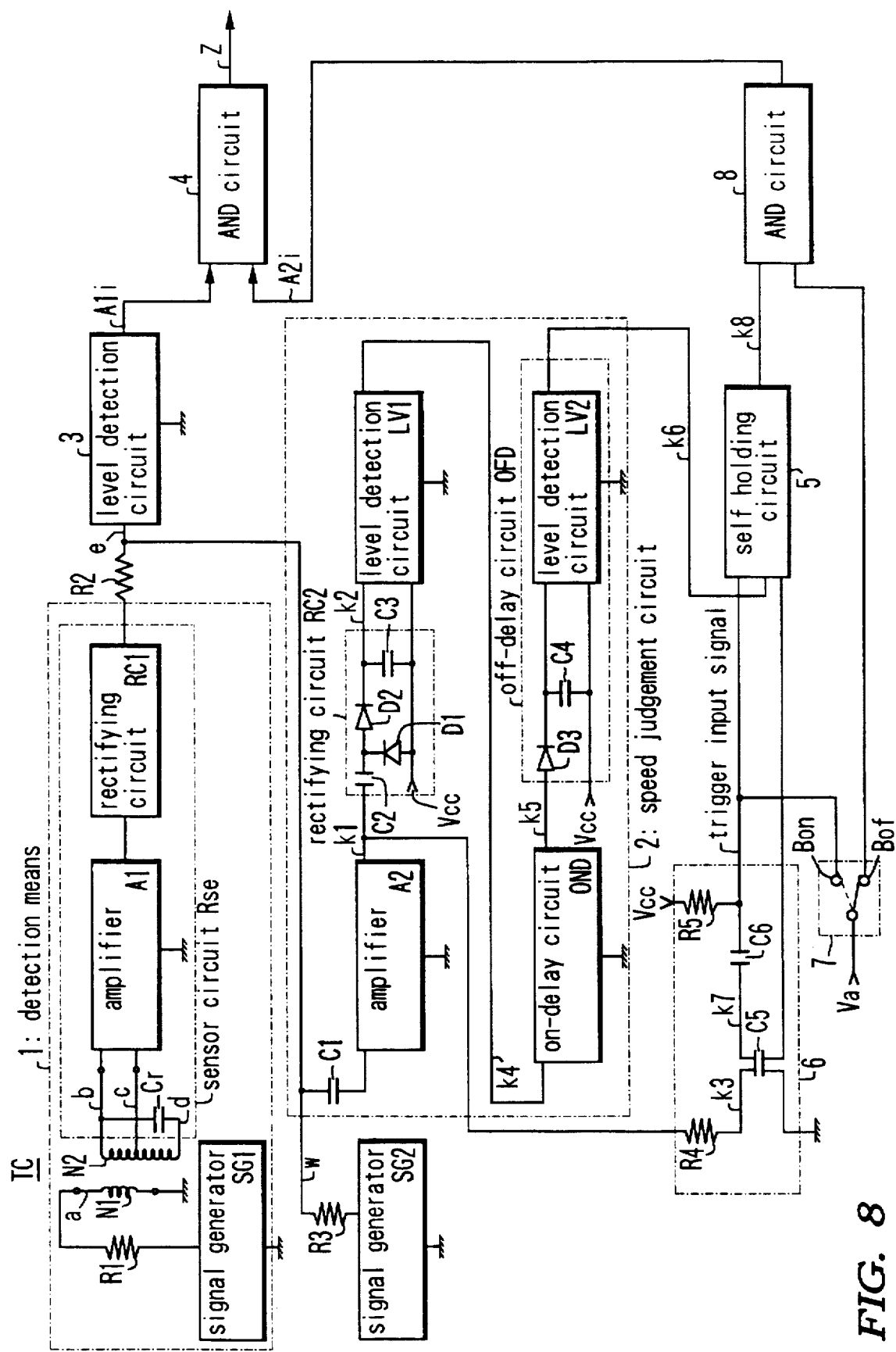
FIG. 8 is another specific example of the apparatus for confirming stop of movable portion according to the present invention shown in FIG. 6.

FIG. 8 shows yet another embodiment of the apparatus for confirming stop of movable portion according to the present invention.

In the embodiment shown in FIGS. 6 and 7, unless the movable portion Rot is not rotating when the source voltage Vcc is applied, the output signal of the self holding circuit 5 does not enter a high level state with a logical value of 1, which indicates stop of rotation. The embodiment shown in FIG. 8 provides a solution to this problem. As a means for achieving the solution, the device in FIG. 8 is provided with a switch 7. If the movable portion Rot is stopped at startup, the logical value of the output signal k6 of the off-delay circuit OFD is set to 1. In this state, the switch 7 is connected to the side of a contact point Bon to set it to on in order to forcibly provide the self holding circuit 5 with a DC input signal Va at high level (logical value 1) as a trigger input signal. With this, the output signal k8 of the self holding circuit 5 enters a high level state with the logical value 1, which indicates stop of rotation and, as a result, even at startup, the output signal k8 of the self holding circuit 5 can be set in a high level state which corresponds to the stop of rotation of the movable portion.

If an error occurs such as the contact point on the Bon side remaining in a closed state, the input signal Va supplied from the outside will be constantly input and the self holding circuit 5 will, at all times, generate an output whose logical value is 1. As a means for avoiding such a condition, an AND circuit 8 is provided. By reversing the switch 7 from the contact point Bon to a contact point Bof, a high level input signal Va is provided to the AND circuit 8 through the contact point Bof and the AND circuit 8 uses the AND output signal of this input signal Va and the output signal k8 of the self holding circuit 5 as an input signal A2$i$ for the AND circuit 4. As a result, since the output signal k8 output of the self holding circuit 5 is set to high only when a normal trigger input signal resulting from stop of rotation of the movable portion Rot is provided by the rotation detection circuit 6, the error described above does not occur.

Figure 9:
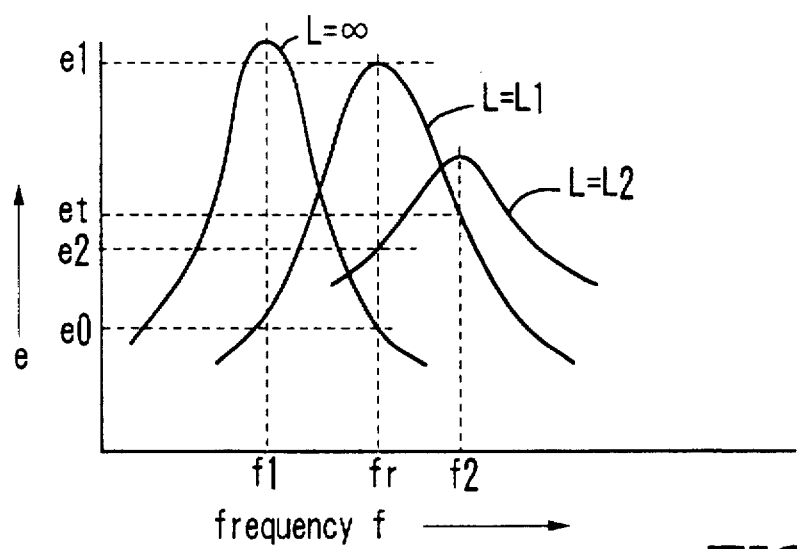
FIG. 9 shows improved frequency-detection signal characteristics with the combination of the coil and the movable portion shown in FIG. 2.

Next, in reference to FIG. 9, yet another embodiment is explained. In the embodiment shown in FIGS. 6 and 7, if the coil TC has already dropped at startup, an erroneous stop verification signal Z will be generated. Taking into consideration the possible falling down of the coil, the device disclosed in the International Publication WO 94/2303 mentioned earlier is provided with a coil on one side of the bridge circuit to ensure that an output signal for stop verification is generated only within a limited range of distance between the metal movable portion and the coil. As a means for achieving this, the level detection circuit is constituted with a so-called window comparator circuit, having upper limit and lower limit threshold values. However, a bridge circuit requires complicated adjustment. In order to eliminate this problem, in the present invention, the coil TC constitutes a resonance circuit that includes the movable portion Rot. This specific aspect of the present invention is explained in reference to FIG. 9.

FIG. 9 shows the characteristics that are achieved when the movable portion Rot is constituted of a good conductor such as copper, aluminum or the like and a resonance circuit that resonates with the operating frequency fr is constituted with the coil TC, the resonance capacitor Cr, the movable portion Rot in a state in which the coil TC is sufficiently close to the movable portion Rot, i.e., L=L1. When the movable portion Rot is far enough away from the coil TC (L=∞), the Q factor between the movable portion Rot and the coil TC increases and also the self inductance of the coil TC increases. Consequently, the resonance frequency shifts to a frequency f1, which is lower than the operating frequency fr.

When the coil TC further approaches the movable portion Rot so that the distance L2<L1, the Q factor of the coil TC is reduced and the inductance also becomes reduced. Consequently, the resonance frequency shifts to a frequency f2, which is higher than the operating frequency fr. Thus, if the coil TC moves away from the movable portion Rot to a specific operating frequency fr, the output level e of the rotation sensor is set to e0 (<e1),whereas, if the coil TC comes too close, this output level e is set to e2<e1 and, in either case, the output level e is reduced. Therefore, the error described above can be prevented by setting the threshold value et of the level detection circuit 3 between the output level e1 when the distance L is at L1 and the higher level of the following two levels, i.e., level e0 when the coil TC has fallen down or the level e2 when the coil TC has come too close.

Figure 10:
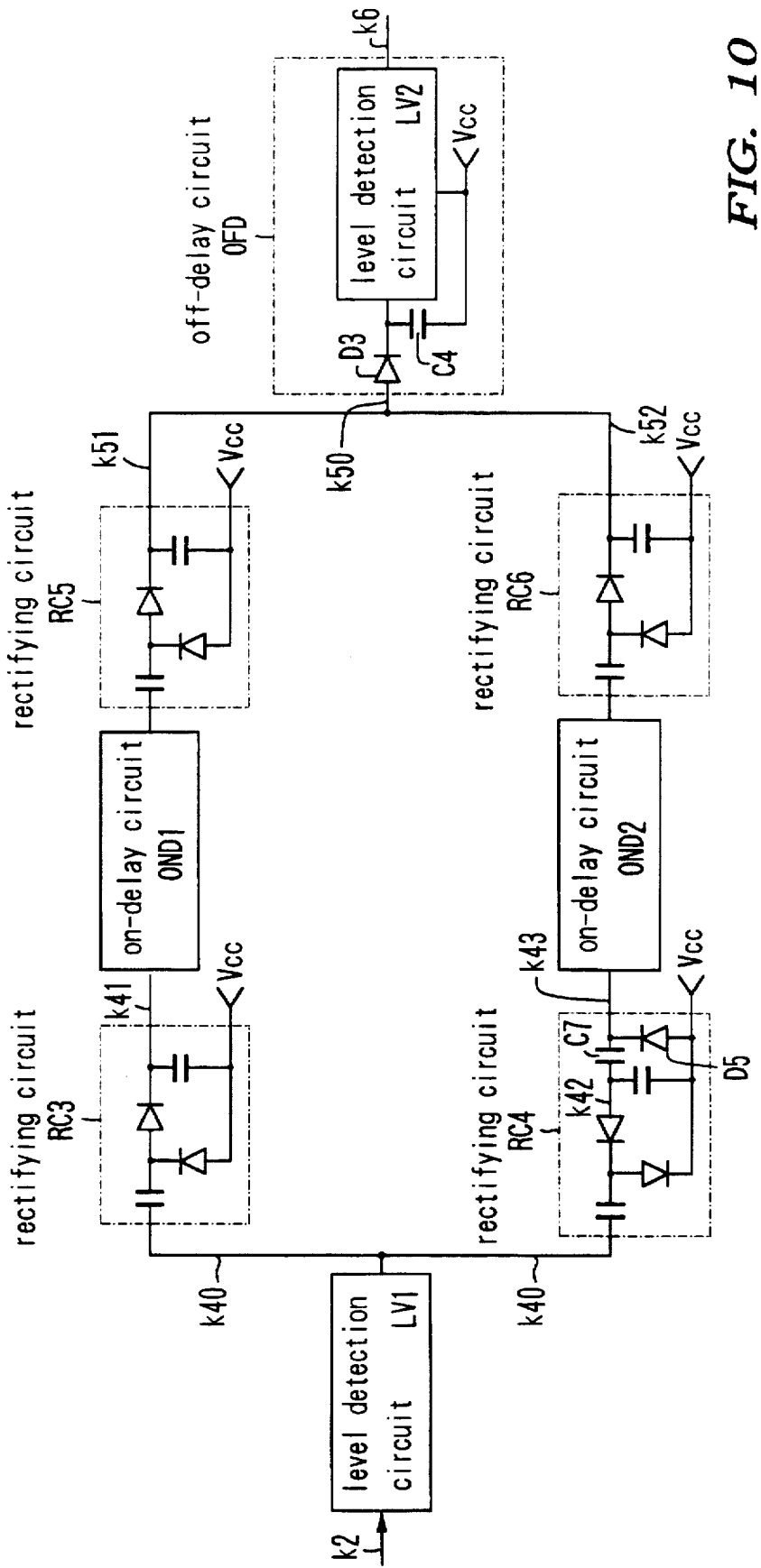
FIG. 10 is an electric circuit diagram illustrating yet another example of the speed judgement circuit included in the apparatus for confirming stop of movable portion according to the present invention.

FIG. 10 shows yet another embodiment of the apparatus for confirming stop of movable portion according to the present invention. The device in FIG. 10 includes a rectifying circuit RC3, a rectifying circuit RC4, an on-delay circuit OND1, a rectifying circuit RC5, a capacitor C7 for AC coupling, a clamping diode D5, an on-delay circuit OND2, a rectifying circuit RC6 and an off-delay circuit OFD.

The rectifying circuit RC3 rectifies an AC output signal k40 of the level detection circuit LV1 (see FIG. 2) to a positive voltage signal. The rectifying circuit RC4 rectifies the AC output signal k40 of the level detection circuit LV1 to a negative voltage signal. The on-delay circuit OND1 operates with a specific delay time relative to the rise of the output signal of an output signal k41 of the rectifying circuit RC3. The rectifying circuit RC5 rectifies an AC output signal from the on-delay circuit OND1 to generate an output signal k51. The capacitor C7 for AC coupling transmits the AC component of an output signal k42 of the rectifying circuit RC4. The AC signal k43 that is transmitted is clamped to the source potential Vcc at the clamping diode D5 to be input to the on-delay circuit OND2. The on-delay circuit OND2 uses the signal k43, which is transmitted via the capacitor C7, as an input signal. The rectifying circuit RC6 rectifies an AC output signal from the on-delay circuit OND2 to generate an output signal k52. The OR (wired OR) of the output signal k51 of the rectifying circuit RC5 and the output signal k52 of the rectifying circuit RC6 is input to the off-delay circuit OFD.

The route through which the AC output signal k40 of the level detection circuit LV1 is converted to the DC output signal k41 of the rectifying circuit RC3 and then is transmitted as the output signal k51 of the rectifying circuit RC5 through the on-delay circuit OND1 and the route through which the AC output signal k40 of the level detection circuit LV1 is converted to an output signal k42 of the rectifying circuit RC4 and is then transmitted as the DC output signal k52 of the rectifying circuit RC6 via the on-delay circuit OND2 are constituted, as far as the circuit structure is concerned, to have a function identical to that of the route through which the signals are transmitted from the level detection circuit LV1 through the on-delay circuit OND in FIGS. 2 and 7 except for the circuit structures of the rectifying circuits RC3 and RC4 and the signal transmission path constituted with the capacitor C7 and the diode D5.

Figure 11:
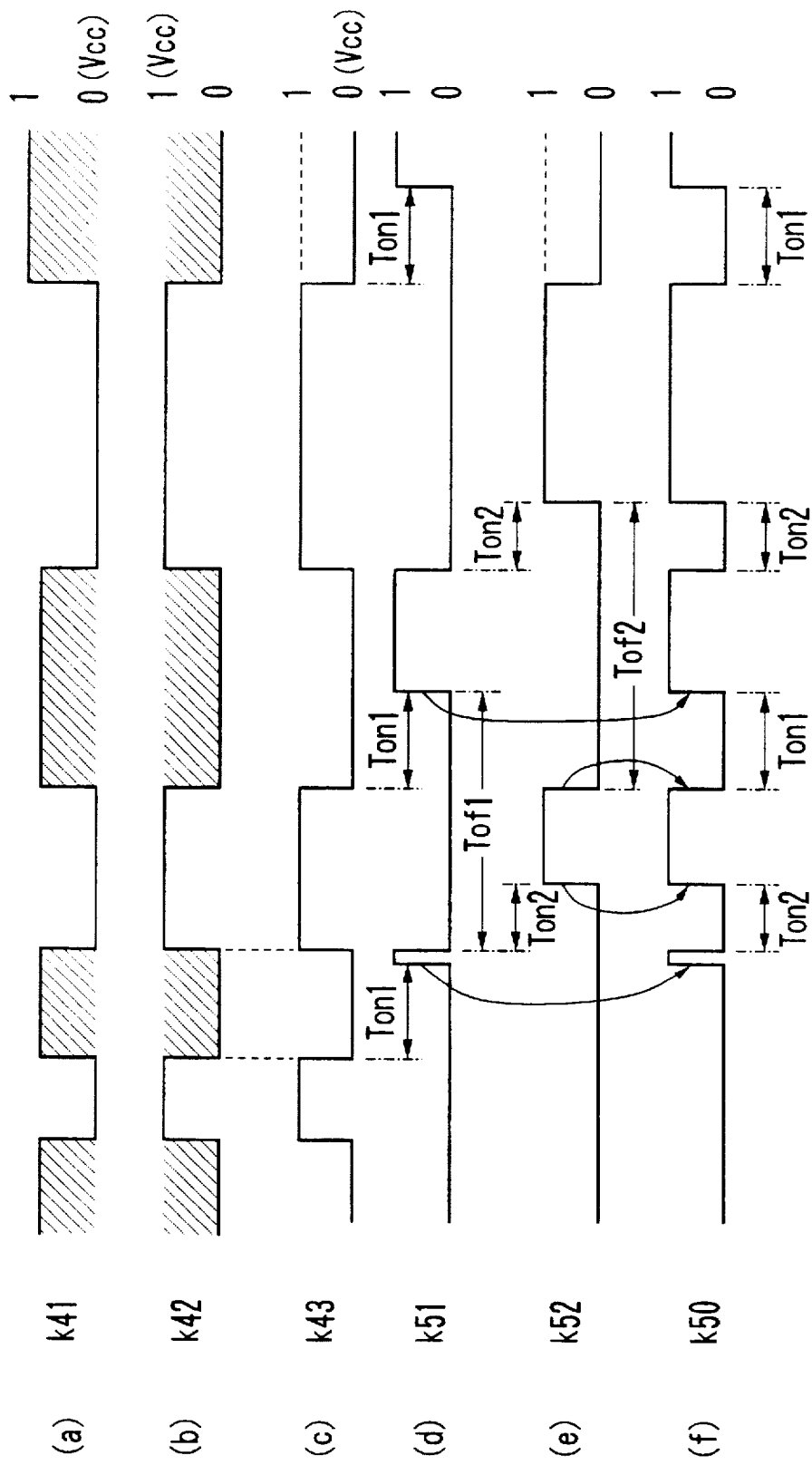
FIG. 11 shows a time chart of the operation performed when the speed judgement circuit shown in FIG. 10 is employed.

Next, in reference to the time chart shown in FIG. 11, the operation of the circuit shown in FIG. 10 is explained. The output signal k40 of the level detection circuit LV1 is rectified at the rectifying circuit RC3 and is generated as a positive rectified output signal k41. This rectified output signal k41 changes between the source potential Vcc (logical value 0) and a positive output voltage (logical value 1) which is at a higher level than the source potential Vcc, in conformance to the indentations Py1 and Py2 of the movable portion Rot, as shown in Time Chart (a) in FIG. 11. The shaded areas indicate the time blocks over which the rectified DC output signal k40 is generated.

The output signal k51 of the on-delay circuit OND1 is generated with a delay corresponding to the rise delay time Ton1 of the on-delay circuit OND1 after the rectified output signal k41 is generated, as shown in Time Chart (d). Then, as shown in FIG. 5, the duration of output dissipation time constituted of the time Tof1 constitutes wait time.

The output signal k42 of the rectifying circuit RC4, which rectifies the output signal k40 of the level detection circuit LV1 to a negative signal, changes between the source potential Vcc (logical value 1) and the negative output voltage (logical value 0) which is at a lower level than the source potential Vcc, in conformance to the indentations Py1 and Py2 of the movable portion Rot, as shown in Time Chart (b). The shaded areas indicate the time blocks over which the rectified output signal k42 is generated. This output signal k42 is input to the on-delay circuit OND2 as a signal k43 (see Time Chart (c) in FIG. 11) via the capacitor C7 and the clamping diode D5. Since the signal k43 is clamped at the source potential Vcc by the diode D5, the level of the logical value 0 is set to the source potential Vcc, as shown in Time Chart (c). The output signal k52 (see Time Chart (e)) is obtained through the on-delay circuit OND2 and the rectifying circuit RC6 is generated with a delay equivalent to the rise delay time Ton2 of the on-delay circuit OND2 after the signal k43 is generated, and then, after the signal k43 has dissipated, a wait state exists until the output off time constituted of the time Tof2 elapses.

The off-delay circuit OFD uses the OR signal k50 constituted of the output signal k51 of the rectifying circuit RC5 and the output signal k52 of the rectifier circuit RC6 as its input signal. In the OR signal k50, time blocks where the logical value is set to 0 (low level blocks) are generated by the rise delay times of the two on-delay circuits OND1 and OND2, as shown in Time Chart (f) and, as a result, the length of time over which it is continuously off is reduced compared to the output off time in the on-delay circuit shown in FIG. 5.

This period of time over which the output is continuously off is significant from the viewpoint of safety. In other words, when the movable portion Rot starts to rotate at high speed after stopping temporarily, the output signal from the on-delay circuit dissipates immediately because of the resulting rotation signal. However, the output signal from the off-delay circuit does not dissipate immediately and there will be a delay corresponding to the fall delay time of the off-delay circuit. Thus, as far as safety is concerned, it is desirable that the delay time of the off-delay circuit be short. In the embodiment shown in FIG. 10, a function for low speed judgement effected by the anti-phase signal of the output signal from the level detection circuit LV1 is added to the on-delay circuit OND1 shown in FIGS. 2 and 7, and the function of the off-delay circuit OFD is to be incorporated in the OR output signal k50 constituted of the output signals k51 and k52 from the on-delay circuits OND1 and OND2. This makes it possible to reduce the delay time caused by the off-delay circuit OFD.

Figure 12:
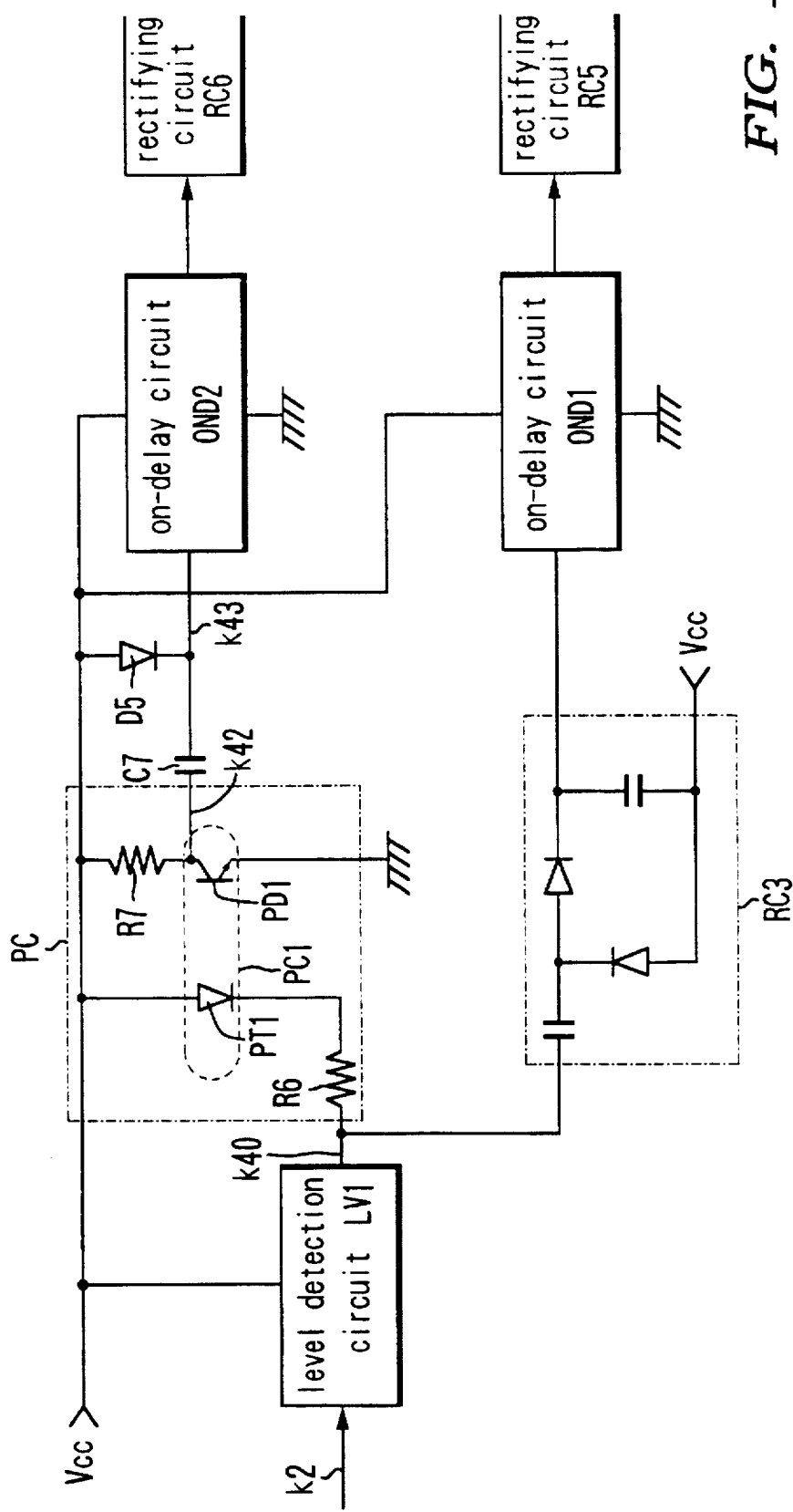
FIG. 12 is an electric circuit diagram of an example of a variation of the speed judgement circuit shown in FIG. 10.

In FIG. 12, an optically coupled circuit PC is employed in place of the negative rectifying circuit RC4 shown in FIG. 10. The optically coupled circuit PC includes an optically coupled element PC1 constituted with a light emitting element PT1 and a light receiving element PD1, a current limiting resistance R6 and a load resistance R7 for the light emitting element PD1. Note that the same reference numbers as those in FIG. 10 are assigned to indicate identical components.

An output current signal k40 from the level detection circuit LV1 is provided for the light emitting element PT1 via the resistance R6. The optical output signal from the light emitting element PT1 is received at the light receiving element PD1 and when this happens, the terminal voltage of the load resistance R7 changes to generate a signal k42. The signal k42 is output with its phase inverted relative to the optical signal from the light emitting element PT1. In addition, since the high frequency component is not transmitted in an optically coupled element, the signal K42 forms a waveform identical to that shown in Time Chart (b).

Note that while FIGS. 1 and 6 show the indentations and projections of the movable portion as deformations of contour, it is obvious that the magnetic deformation does not necessarily have to be based on shape. In other words, it is obvious that similar advantages can be obtained by using insulating material and conducting material instead of indentations and projections.

While the present invention has been explained in detail in reference to the preferred embodiments, it will be obvious to a person skilled in the art to which the present invention pertains, that it is not limited to these embodiments and that a number of variations are possible based upon the teachings and the spirit of the present invention.

INDUSTRIAL APPLICABILITY

The present invention offers the following possibilities for industrial application:

(a) An apparatus for confirming stop of movable portion in which the delay in notification of stop of the movable portion is reduced, can be provided.

(b) An apparatus for confirming stop of movable portion that issues notification of movable portion stop after detecting that the coil is combined with the movable portion correctly with no risk of it coming in contact with the movable portion, can be provided.

(c) An apparatus for confirming stop of movable portion in which the notification of movable portion stop is issued based upon verification that the movable portion has been monitored until immediately before the notification is issued, can be provided.

(d) An apparatus for confirming stop of movable portion that is capable of generating a signal to indicate movable portion stop based upon verification made with a startup switch at the time of startup, can be provided.

(e) An apparatus for confirming stop of movable portion that issues notification of movable portion stop based upon verification that the movable portion has been monitored even at the time of startup, can be provided.

(f) An apparatus for confirming stop of movable portion in which the delay time of dissipation of the movable portion stop signal can be reduced when the movable portion has started rotating or moving, can be provided.

(g) An apparatus for confirming stop of movable portion that facilitates adjustment can be provided.

We claim:

1. An apparatus for confirming stop of movable portion for detecting stop of a metal movable portion comprising:

detection means including a coil provided in close proximity to a surface of said movable portion and detecting changes in impedance generated at said coil caused in response to indentations and projections provided at said surface of said movable portion to output a detection signal;

a speed judgement circuit, to which said detection signal output from said detection means is provided, continuously generating a high level output signal when intervals between changes in said detection signal become longer than a specific period;

a level detection circuit, to which said detection signal output from said detection means is provided, generating a high level output signal when said detection signal is at or higher than a specific level; and an AND circuit, to which said output signal from said speed judgement circuit and said output signal from said level detection circuit are provided, generating an output signal resulting from AND calculation of said output signals.

2. An apparatus for confirming stop of movable portion according to claim 1, wherein:

said speed judgement circuit includes an on-delay circuit and an off-delay circuit;

said on delay circuit, to which a signal that contains a component of said detection signal output from said detection means is provided, generates an output signal that responds immediately to a fall of said signal and rises with a delay of a specific length of time after a rise of said signal; and said off-delay circuit responds immediately to a rise of said output signal output from said on-delay circuit, causes said output signal to be delayed by a specific length of time when said output signal falls and provides an output signal to said AND circuit.

3. An apparatus for confirming stop of movable portion according to claim 2, further comprising:

means for generating a high frequency signal, wherein:
said high frequency signal thus generated is superimposed on said detection signal output from said detection means and said signal thus superimposed is provided to said speed judgement circuit.

4. An apparatus for confirming stop of movable portion according to claim 3, wherein:

said speed judgement circuit includes a low-pass filter which, provided at a stage preceding said on-delay circuit, generates a DC signal at high level when said superimposed signal contains a high frequency component and outputs a signal that responds to a low frequency component based upon said detection signal.

5. An apparatus for confirming stop of movable portion according to claim 4, wherein:

said low-pass filter is constituted with a voltage doubling rectifying circuit, which includes a large capacity coupling capacitor and a small capacity smoothing capacitor.

6. An apparatus for confirming stop of movable portion according to claim 1, further comprising:

a self holding circuit, wherein:
said self holding circuit uses change in an output signal from said detection means as a trigger input signal and uses an output signal from said speed judgement circuit as a reset input signal; and
said AND circuit, to which output signals are provided from said self holding circuit and said level detection circuit, generates an output signal resulting from AND calculation of said output signals.

7. An apparatus for confirming stop of movable portion according to claim 6, further comprising:

a means for startup switching that is operated from outside, wherein:
said means for startup switching is provided with a contact point for providing said self holding circuit with a trigger input signal.

8. An apparatus for confirming stop of movable portion according to claim 7, wherein:

said means for startup switching is provided with another contact point that is closed when said trigger input signal is turned off; and
another AND circuit is provided, which uses signal provided through said another contact point of said means for startup switching when said trigger input signal for said self holding circuit is turned off and an output signal from said self holding circuit as input signals to generate an output constituted with an AND thereof.

9. An apparatus for confirming stop of movable portion according to claim 6, wherein:

said speed judgement circuit includes an on-delay circuit and an off-delay circuit;

said on delay circuit, to which a signal that contains a component of said detection signal output from said detection means is provided, generates an output signal that responds immediately to a fall of said signal and rises with a delay of a specific length of time after a rise of said signal; and said off-delay circuit responds immediately to a rise of said output signal output from said on-delay circuit, causes said output signal to be delayed by a specific length of time when said output signal falls and provides an output signal to said AND circuit.

10. An apparatus for confirming stop of movable portion according to claim 9, further comprising:

means for generating a high frequency signal, wherein:
said high frequency signal thus generated is superimposed on said detection signal output from said detection means and said signal thus superimposed is provided to said speed judgement circuit.

11. An apparatus for confirming stop of movable portion according to claim 10 wherein:

said speed judgement circuit includes a low-pass filter which, provided at a stage preceding said on-delay circuit, generates a DC signal at high level when said superimposed signal contains a high frequency component and outputs a signal that responds to a low frequency component based upon said detection signal.

12. An apparatus for confirming stop of movable portion according to claim 11, wherein:

said low-pass filter is constituted with a voltage doubling rectifying circuit, which includes a large capacity coupling capacitor and a small capacity smoothing capacitor.

13. An apparatus for confirming stop of movable portion according to claim 1, wherein:

said speed judgement circuit includes two on-delay circuits and an off-delay circuit, said two on-delay circuits to which a signal containing said detection signal output from said detection means is commonly provided generate output signals whose phases are inverse from each other; and said off-delay circuit is provided with an OR signal constituted of said output signals from said two on-delay circuits.

14. An apparatus for confirming stop of movable portion according to claim 13 further comprising:

means for generating a high frequency signal, wherein:
said high frequency signal thus generated is superimposed on said detection signal output from said detection means and said signal thus superimposed is provided to said speed judgement circuit.

15. An apparatus for confirming stop of movable portion according to claim 14 wherein:

said speed judgement circuit includes a low-pass filter which, provided at a stage preceding said on-delay circuit, generates a DC signal at high level when said superimposed signal contains a high frequency component and outputs a signal that responds to a low frequency component based upon said detection signal.

16. An apparatus for confirming stop of movable portion according to claim 15, wherein:

said low-pass filter is constituted with a voltage doubling rectifying circuit, which includes a large capacity coupling capacitor and a small capacity smoothing capacitor.

17. An apparatus for confirming stop of movable portion according to claim 1, wherein:

said coil constitutes a resonance circuit that includes said movable portion.

* * * * *